Aug. 3, 1943.                R. RICO                2,325,879
                          BEAN HARVESTER
              Filed Dec. 29, 1941        2 Sheets-Sheet 1
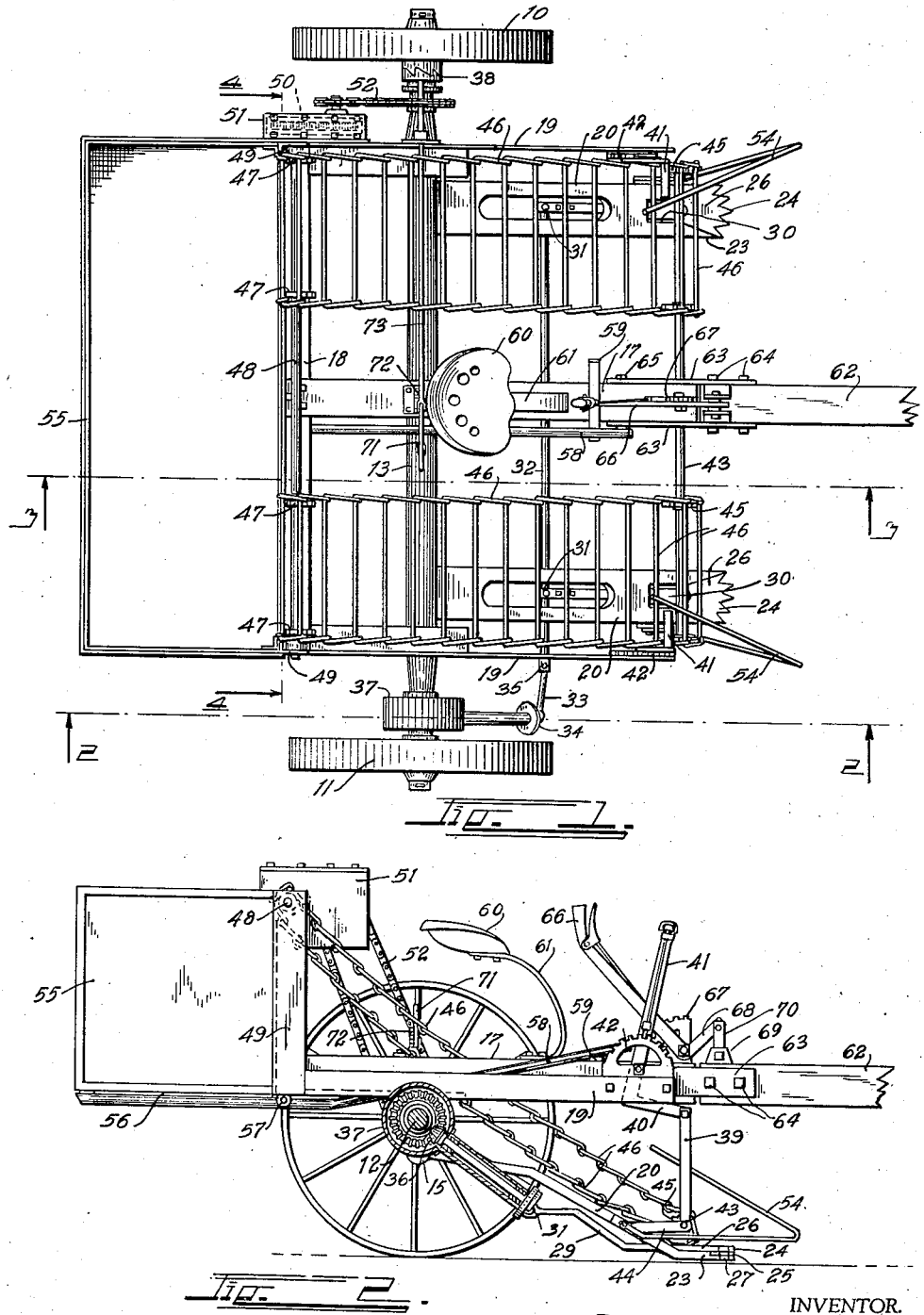
INVENTOR.
RICHARD RICO
BY
ATTORNEY.

Aug. 3, 1943.    R. RICO    2,325,879
BEAN HARVESTER
Filed Dec. 29, 1941    2 Sheets-Sheet 2
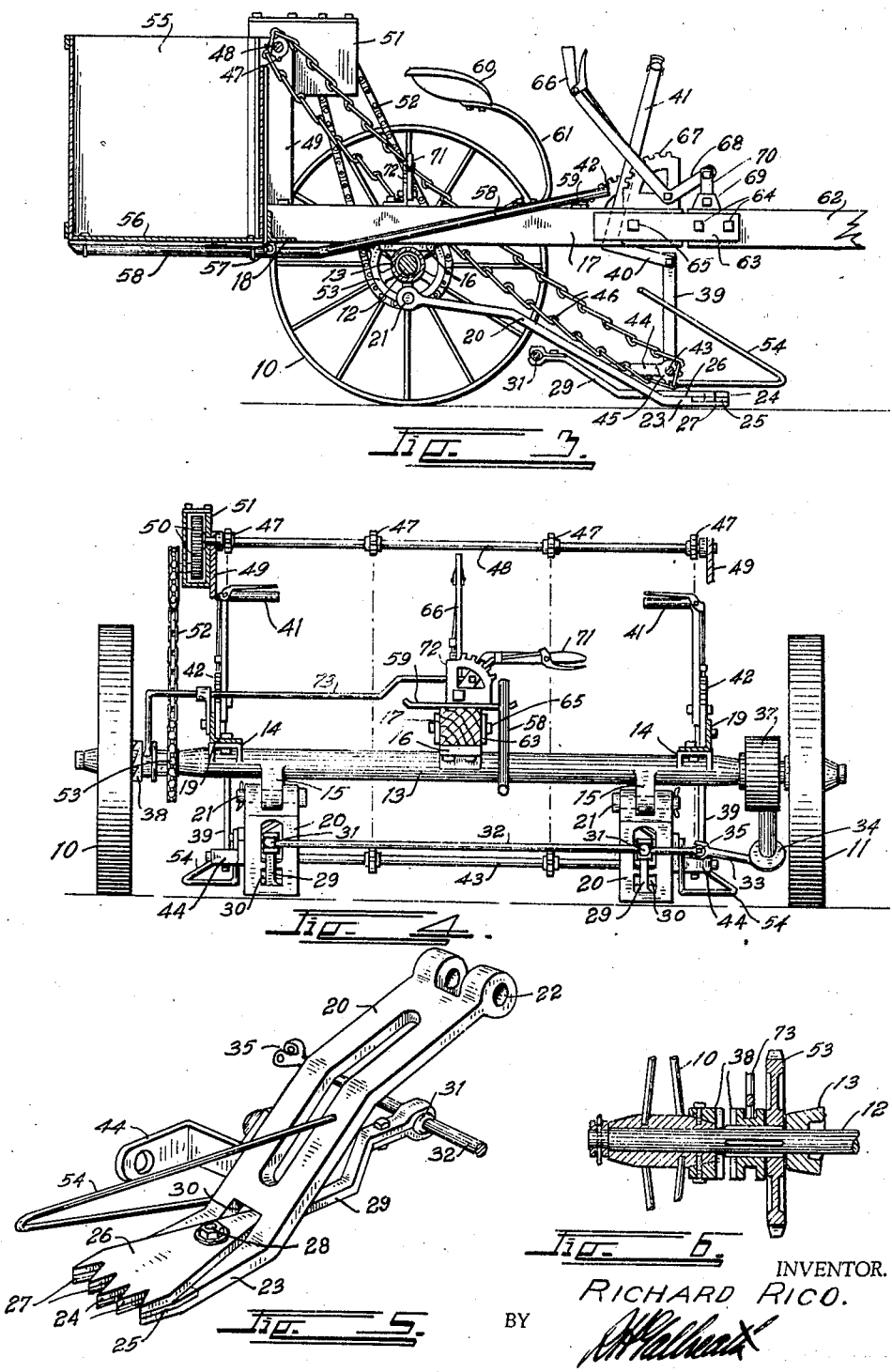
INVENTOR.
RICHARD RICO.
BY
ATTORNEY.

Patented Aug. 3, 1943

2,325,879

UNITED STATES PATENT OFFICE 2,325,879

BEAN HARVESTER

Richard Rico, Byers, Colo.

Application December 29, 1941, Serial No. 424,705

9 Claims. (Cl. 56—155)

This invention relates to a bean harvester and has for its principal object the provision of a two-row implement which will cut the vines, gather and collect them into a collecting box and dump the collected vines at regular intervals into piles on the field.

Other objects of the invention are to provide a "two-row" implement of this character which can be regulated so that one cutter may travel at a higher elevation than the other should the rows be of uneven elevation; to provide efficient means for lifting the cutters high above the ground for transportation purposes; and to provide a highly efficient and continuously operating cutting and gathering mechanism for harvesting the vines.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved bean harvester;

Fig. 2 is a side view thereof, with the near wheel removed, the view being taken on the line 2—2, Fig. 1;

Fig. 3 is a longitudinal section, taken on the line 3—3, Fig. 1;

Fig. 4 is a cross section, taken on the line 4—4, Fig. 1;

Fig. 5 is a detail perspective view of the cutting mechanism; and

Fig. 6 is a fragmentary detail view of the controlling clutch mechanism.

The improved bean cutter is supported upon ground engaging wheels 10 and 11 mounted to freely revolve about the extremities of an axle 12 which is carried in an axle housing 13.

The axle may be caused to rotate whenever desired through the medium of a toothed clutch 38 which acts to connect it with the wheel 10 when desired. The axle housing 13 is provided with two frame pads 14 on its upper side adjacent its extremities and with two cutter lugs 15 on its lower side immediately inside of the pads 14. A tongue pad 16 is also formed on the axle housing at the middle of its upper surface. A tongue stub 17 is secured on the tongue pad 16 and extends forwardly and rearwardly therefrom.

An angle frame member 18 is secured across the rear extremity of the tongue stub 17 and extends oppositely outward therefrom terminating in forwardly-projecting side frame members 19 which are bolted or otherwise secured to the two frame pads 14. This structure forms an E-shaped frame with the tongue stub forming the middle member thereof.

Two cutter bars 20, as illustrated in Fig. 5, are mounted on hinge pins 21 one of which extends through each of the cutter lugs 15, the cutter bars being provided with suitable eyes 22 for receiving the hinge pins. Each cutter bar extends forwardly and downwardly from the axle housing terminating in a substantially horizontal foot portion 23. The forward edge of the foot portion is serrated to form cutting teeth 24 which are reinforced by means of a removable notched cutting plate 25.

A toothed knife member 26 rests upon each foot 23 and terminates in forwardly projecting teeth 27 which register with the teeth in the foot 23. The knife member is pivotally secured on the foot by means of a suitable pivot bolt 28 about which it swings. Each knife member is formed with a lever arm 29 which extends through a passage 30 in the cutter bar 20. The rearward extremities of the levers 29 are attached by means of suitable ball and socket joints 31 to a pitman rod 32 which extends across the implement between the two cutter bars.

It will be seen that when the pitman rod 32 is reciprocated longitudinally, it will cause the coacting teeth 24 and 27 of both cutter bars to open and close so as to exert a shearing action. The pitman rod is reciprocated by means of a connecting rod 33 extending from a crank member 34 to a universal connection 35 on one extremity of the pitman rod 32. The crank member 34 is rotated through the medium of suitable bevel gears 36 driven from the axle 12, there being a suitable housing 37 surrounding these gears and their shafts.

The forward extremities of the cutter bars 20 are supported by means of suspension links 39 suspended from cranks 40 formed on depth levers 41. Each of the depth levers is pivotally mounted in a locking sector 42 secured on one of the forwardly projecting frame members 19. The lower extremities of the suspension links rotatably support a cross sprocket shaft 43 which extends across the implement immediately above the feet 23 of the cutters and which is journalled in brackets 44 extending from the cutter bars 20. It will be noted that the elevation of each end of the cross shaft 43 is controlled independently so that one cutter may be elevated or lowered independently of the other cutter.

The cross shaft 43 is provided with elevator sprockets 45 from which two flexible elevating chains 46 are trained around the sprockets 45. The chains 46 extend rearwardly and upwardly to drive sprockets 47 secured on an upper elevator shaft 48. The upper elevator shaft is supported on angle posts 49 which extend upwardly from each extremity of the cross frame member 18. The upper elevator shaft is driven through reversing gears 50, contained within a gear housing 51, by means of a drive chain 52 extending from a drive sprocket 53 which is secured on the axle 12 to be rotated thereby.

Vine guards 54 project forwardly and outwardly from the lower extremities of the cutter bars 20. As the vines are severed by the cutters, they are gathered onto the elevated chains 46 by the guards 54 and are elevated to the upper extremities of these chains where they are dropped into a collecting box 55.

The box 55 is formed with a hinged bottom 56 supported from a hinge 57 along the forward edge of the box. The weight of the vines on the bottom 56 is counter-acted by means of a bottom lever 58 which extends forwardly from the bottom alongside the tongue stub 17 where it rests on an operator's foot rest 59. The foot rest is positioned at a convenient point on the tongue stub 17 ahead of an operator's seat 60 which is supported from the tongue stub on a resilient seat bar 61.

The tongue stub is joined to a main tongue 62 by means of side plates 63. The side plates 63 are secured in fixed relation to the main tongue 62 by means of clamp bolts 64 and they are pivotally secured to the tongue stub by means of a pivot bolt 65 so that the entire tongue structure can be broken upwardly at the plates to elevate the cutter from the ground. This breaking is accomplished by means of a tongue lever 66 which is pivoted in a sector bracket 67 fixed to the forward extremity of the tongue stub intermediate the pivot bolt 65 and the clamp bolts 64. The lever 66 is formed with a bell crank 68 which extends forwardly to linked attachment with a bracket 69 fixed on the rear extremity of the main tongue 62. When the lever 66 is pushed forwardly, it exerts a prying action, on the line 70 as a fulcrum, and lifts the forward extremity of the tongue stub 17 so as to lift the cutter above the ground with the entire frame tilting downwardly and rearwardly.

The clutch 38 is controlled from a clutch lever 71 mounted in a clutch lever sector 72 on the tongue stub 17. The clutch lever 71 is connected to the clutch 38 through the medium of a yoke rod 73. The lever 71 is positioned within easy reach of the operator beneath the seat 60.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A bean harvester comprising: a vehicle axle; ground engaging wheels supporting said axle; a pair of spaced apart cutter bars hingedly supported by said axle and extending forwardly therefrom; teeth on the forward extremities of said cutter bars; a toothed knife member pivoted on top of the forward extremity of each cutter bar with its teeth in register with the teeth of the latter; a lever arm extending rearward from each knife member; a pitman rod; a universal hinge connecting the rearward extremity of each lever arm to said pitman rod; and means for reciprocating said pitman rod.

2. A bean harvester comprising: a vehicle axle; ground engaging wheels supporting said axle; a pair of spaced apart cutter bars hingedly supported by said axle and extending forwardly therefrom; teeth on the forward extremities of said cutter bars; a toothed knife member pivoted on top of the forward extremity of each cutter bar with its teeth in register with the teeth of the latter; a lever arm extending rearward from each knife member; a pitman rod; a universal hinge connecting the rearward extremity of each lever arm to said pitman rod; means for reciprocating said pitman rod; and independent means for raising and lowering the forward extremity of each cutter bar.

3. A bean harvester comprising: a vehicle axle; ground engaging wheels supporting said axle; a pair of spaced apart cutter bars hingedly supported by said axle and extending forwardly therefrom; teeth on the forward extremities of said cutter bars; a toothed knife member pivoted on top of the forward extremity of each cutter bar with the teeth in register with the teeth of the latter; a lever arm extending rearward from each knife member; a pitman rod; a universal hinge connecting the rearward extremity of each lever arm to said pitman rod; means for reciprocating said pitman rod; a vehicle frame secured on said axle and extending over said cutter bars; an adjusting lever mounted on said frame over each cutter bar; and a suspension link extending from each of the latter levers to its respective cutter bar so that the latter are independently and adjustably supported.

4. A bean harvester comprising: a vehicle axle; ground engaging wheels supporting said axle; a pair of spaced apart cutter bars hingedly supported by said axle and extending forwardly therefrom; teeth on the forward extremities of said cutter bars; a toothed knife member pivoted on top of the forward extremity of each cutter bar with the teeth in register with the teeth of the latter; a lever arm extending rearward from each knife member; a pitman rod; a universal hinge connecting the rearward extremity of each lever arm to said pitman rod; means for reciprocating said pitman rod; a vehicle frame secured on said axle and extending over said cutter bars; an adjusting lever mounted on said frame over each cutter bar; a suspension link extending from each of the latter levers to its respective cutter bar so that the latter are independently and adjustably supported; and means for tilting said frame upwardly at the front to lift both cutter bars simultaneously.

5. A bean harvester comprising: a vehicle axle; ground engaging wheels supporting said axle; a pair of spaced apart cutter bars hingedly supported by said axle and extending forwardly therefrom; teeth on the forward extremities of said cutter bars; a toothed knife member pivoted on top of the forward extremity of each cutter bar with its teeth in register with the teeth of the latter; a lever arm extending rearward from each knife member; a pitman rod; a universal hinge connecting the rearward extremity of each lever arm to said pitman rod; means for reciprocating said pitman rod; an endless, flexible elevator device arising from each cutter bar rearwardly of the teeth thereof; and means for supporting each elevator device from its respective cutter bar so that it will rise and fall with the latter.

6. A bean harvester comprising: a vehicle axle; ground engaging wheels supporting said axle; a pair of spaced apart cutter bars hingedly supported by said axle and extending forwardly therefrom; teeth on the forward extremities of said cutter bars; a toothed knife member pivoted on top of the forward extremity of each cutter bar with its teeth in register with the teeth of the latter; a lever arm extending rearward from each knife member; a pitman rod; a universal hinge connecting the rearward extremity of each lever arm to said pitman rod; means for reciprocating said pitman rod; an endless, flexible elevator device arising from each cutter bar rearwardly of the teeth thereof; means for supporting each elevator device from its respective cutter bar so that it will rise and fall with the latter; means for receiving the material elevated by said elevator devices; and means for dumping said material at desired intervals.

7. A bean harvester comprising: a vehicle axle; ground engaging wheels supporting said axle; a pair of spaced apart cutter bars hingedly supported by said axle and extending forwardly therefrom; teeth on the forward extremities of said cutter bars; a toothed knife member pivoted on top of the forward extremity of each cutter bar with the teeth in register with the teeth of the latter; a lever arm extending rearward from each knife member; a pitman rod; a universal hinge connecting the rearward extremity of each lever arm to said pitman rod; means for reciprocating said pitman rod; a vehicle frame secured on said axle and extending over said cutter bars; an adjusting lever mounted on said frame over each cutter bar; a suspension link extending from each of the latter levers to its respective cutter bar so that the latter are independently and adjustably supported; a tongue stub extending forwardly from said frame; a tongue hinged to and extending forward from said tongue stub; and manual means for raising and lowering the hinged point between said tongue stub and said tongue for simultaneous vertical adjustment of said cutter bars.

8. In a bean harvester the combination of a wheel supported axle; an axle housing surrounding said axle between said wheels; a tongue member secured to the midportion of said axle housing and extending forwardly therefrom; a frame member secured to said housing at each extremity of the latter and extending forwardly to a supporting connection with said tongue member; a cutter bar hinged to said housing at each side of said tongue member, said cutter bars extending forwardly and downwardly from said housing; means for adjustably and independently supporting the forward extremities of said cutter bars from said frame; a knife member hinged upon each cutter bar; coacting teeth in the forward edges of said knife members and said cutter bars; a lever extending rearwardly from each knife member through an opening in its respective cutter bar to a position behind and below the latter; a pitman rod; universal joints joining the rearward extremities of said levers to said pitman rod so that each lever may be tilted independently of the other; means for reciprocating said pitman rod as a consequence of the rotation of said wheels; an endless chain elevator over each cutter bar; means for supporting the upper extremities of both elevators from said frame; and means for individually supporting each elevator from its respective cutter bar so that it will rise and fall with the latter.

9. In a bean harvester the combination of a wheel supported axle; an axle housing surrounding said axle between said wheels; a tongue member secured to the midportion of said axle housing and extending forwardly therefrom; a frame member secured to said housing at each extremity of the latter and extending forwardly to a supporting connection with said tongue member; a cutter bar hinged to said housing at each side of said tongue member, said cutter bars extending forwardly and downwardly from said housing; means for adjustably and independently supporting the forward extremities of said cutter bars from said frame; a knife member hinged upon each cutter bar; coacting teeth in the forward edges of said knife members and said cutter bars; a lever extending rearwardly from each knife member through an opening in its respective cutter bar to a position behind and below the latter; a pitman rod; universal joints joining the rearward extremities of said levers to said pitman rod so that each lever may be tilted independently of the other; means for reciprocating said pitman rod as a consequence of the rotation of said wheels; an endless chain elevator over each cutter bar; means for supporting the upper extremities of both elevators from said frame; means for individually supporting each elevator from its respective cutter bar so that it will rise and fall with the latter; a second tongue member hinged to the forward extremity of the first tongue member; and means for raising and lowering the joint between the two tongue members so as to raise and lower both cutter bars simultaneously when desired.

RICHARD RICO.